United States Patent
Li

(10) Patent No.: US 9,404,006 B2
(45) Date of Patent: Aug. 2, 2016

(54) HYBRID WATER DISPERSIONS, (POLY)ETHYLENE (METH)ACRYLIC ACID COPOLYMER COMPOSITE LATEX EMULSIONS, HYBRID (POLY)ETHYLENE (METH)ACRYLIC ACID ORGANOSILANE COMPOSITE LATEX EMULSIONS, AND COATING COMPOSITIONS FORMED THEREFROM

(71) Applicant: Akzo Nobel Coatings International B.V., Arnhem (NL)

(72) Inventor: Cathy Li, Solon, OH (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/772,801

(22) PCT Filed: Mar. 12, 2014

(86) PCT No.: PCT/EP2014/054762
§ 371 (c)(1),
(2) Date: Sep. 4, 2015

(87) PCT Pub. No.: WO2014/140057
PCT Pub. Date: Sep. 18, 2014

(65) Prior Publication Data
US 2016/0024325 A1 Jan. 28, 2016

Related U.S. Application Data

(60) Provisional application No. 61/802,028, filed on Mar. 15, 2013.

(30) Foreign Application Priority Data

Jul. 30, 2013 (EP) .................... 13178524

(51) Int. Cl.
| | | |
|---|---|---|
| C08F 16/24 | (2006.01) |
| C08F 20/06 | (2006.01) |
| C08F 118/02 | (2006.01) |
| C08F 210/00 | (2006.01) |
| C04B 28/02 | (2006.01) |
| C08G 69/34 | (2006.01) |
| C08G 65/48 | (2006.01) |
| C09D 123/08 | (2006.01) |
| C08J 3/03 | (2006.01) |
| C08F 265/06 | (2006.01) |
| C08F 8/32 | (2006.01) |
| C08F 8/42 | (2006.01) |
| C09D 151/00 | (2006.01) |
| C08J 3/24 | (2006.01) |
| B65D 25/14 | (2006.01) |
| C08K 3/34 | (2006.01) |
| C08K 5/17 | (2006.01) |

(52) U.S. Cl.
CPC .......... *C09D 123/0869* (2013.01); *B65D 25/14* (2013.01); *C08F 8/32* (2013.01); *C08F 8/42* (2013.01); *C08F 265/06* (2013.01); *C08J 3/03* (2013.01); *C08J 3/245* (2013.01); *C08K 3/346* (2013.01); *C08K 5/17* (2013.01); *C09D 151/003* (2013.01); *C08J 2333/02* (2013.01)

(58) Field of Classification Search
CPC .......... C08J 3/245; C08J 3/03; C08J 2333/02; B65D 25/14; C08F 265/06; C08F 8/32; C08F 8/42; C08F 2/22; C08F 220/06; C08F 220/04; C09D 151/003; C09D 123/0869; C08K 3/346
USPC ............... 526/247, 317.1, 319, 348; 524/650, 524/279; 525/390
See application file for complete search history.

(56) References Cited

U.S. PATENT DOCUMENTS

| | | |
|---|---|---|
| 8,349,446 B2 | 1/2013 | Sasaki et al. |
| 2004/0134791 A1 | 7/2004 | Toi et al. |
| 2005/0100754 A1 | 5/2005 | Moncla et al. |
| 2006/0099429 A1 | 5/2006 | Domes et al. |
| 2010/0233470 A1 | 9/2010 | Sasaki et al. |

FOREIGN PATENT DOCUMENTS

| | | |
|---|---|---|
| CA | 2199793 A1 | 6/1998 |
| EP | 1992661 B1 | 11/2008 |
| GB | 1289083 | 9/1972 |
| JP | H10-218944 A | 8/1998 |
| JP | H11-124419 A | 5/1999 |
| JP | H11-269337 A | 10/1999 |
| JP | 2002-235030 A | 8/2002 |
| JP | 2005-068442 A | 3/2005 |
| JP | 2006-022127 A | 1/2006 |
| JP | 2009-144208 A | 7/2009 |
| KR | 2012-128771 A | 11/2012 |
| WO | 92/13012 A1 | 8/1992 |
| WO | 2010/097353 A1 | 9/2010 |
| WO | 2011/011705 A2 | 1/2011 |
| WO | 2012/089747 A1 | 7/2012 |
| WO | WO 2012/089747 A1 * | 7/2012 |
| WO | 2013/037863 A1 | 3/2013 |

OTHER PUBLICATIONS

Search Report and Written Opinion of International Application No. PCT/EP2014/054762, mailed May 16, 2014.
Search Report of EP Application No. 13178524.8, dated Feb. 3, 2014.

* cited by examiner

*Primary Examiner* — William Cheung
(74) *Attorney, Agent, or Firm* — Alice C. Su

(57) ABSTRACT

Hybrid water dispersions are disclosed which can be used in the formation of coating compositions having good blush resistance, abrasion resistance, blister resistance, hardness and scratch resistance, in some embodiments, the coating compositions are used to coat substrates such as cans and packaging materials for the storage of food and beverages. Hybrid water dispersion of the invention may be prepared by mixing a (poly) ethylene (meth) acrylic acid copolymer in water to form a mixture, and reacting the mixture with an organosilane compound.

15 Claims, No Drawings

US 9,404,006 B2

HYBRID WATER DISPERSIONS, (POLY)ETHYLENE (METH)ACRYLIC ACID COPOLYMER COMPOSITE LATEX EMULSIONS, HYBRID (POLY)ETHYLENE (METH)ACRYLIC ACID ORGANOSILANE COMPOSITE LATEX EMULSIONS, AND COATING COMPOSITIONS FORMED THEREFROM

This application is a national stage filing under 35 U.S.C. §371 of PCT/EP2014/054762, filed Mar. 12, 2014, which claims priority to U.S. Provisional Patent Application No. 61/802,028, filed Mar. 15, 2013, and European Patent Application No. 13178524.8, filed Jul. 30, 2013, the contents of which are each incorporated herein by reference in their entireties.

BACKGROUND OF THE INVENTION

1. Field of the Invention

The present invention relates to hybrid water dispersions, (poly(ethylene) (meth)acrylic acid copolymer composite latex emulsions, hybrid (poly)ethylene (meth)acrylic acid organsilane composite latex emulsions, coating compositions formed from the foregoing, methods of coating substrates with the foregoing, and substrates coated with the foregoing.

2. Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable. There is also a desire to eliminate surfactants from such coating compositions, because the surfactants could in theory dissolve in the beverages.

Commonly-owned WO 2010/97353 describes the preparation of latex emulsions used in coating compositions useful for packaging coating beverage inside spray applications. Commonly-owned patent publication WO 2012/089747 describes the preparation of core-shell latex emulsions by for beverage end applications. Such latex emulsions have not achieved the performance of epoxy based coatings and have not been successfully used on a commercial basis in food and beverage coating compositions.

High acid content, high melt index (poly)ethylene (meth) acrylic acid copolymers are dispersible in alkali aqueous dispersions under proper reaction conditions. Such aqueous dispersions are widely used in adhesives, personal care applications and paper coating applications. U.S. Pat. No. 7,803,865 describes a process to prepare such aqueous dispersions in an extruder. However, (poly)ethylene (meth)acrylic acid copolymer dispersions are hydrophilic and have poor chemical resistance and poor blush resistance. Crosslinkers (such as melamine formaldehyde, urea formaldehyde, phenol formaldehyde, alkali metal hydroxides, zinc/zirconium complexes and epoxy resins) have been used to improve chemical and blush resistance, but these crosslinkers do not produce a coating with sufficient chemical and blush resistance required for many packaging coating applications.

There is a need to produce coating compositions that do not contain bisphenol A or are substantially free of bisphenol A. There is also a need to produce coating compositions that do not contain phenolic resins or are substantially free of phenolic resins and do not contain surfactants in order to reduce migration of the coating composition into food and beverages.

SUMMARY OF THE INVENTION

High acid content, high melt index (poly)ethylene (meth) acrylic acid copolymers are dispersible in alkali aqueous dispersions under proper reaction conditions. Such aqueous dispersions are widely used in adhesives, personal care applications and paper coating applications. However, (poly)ethylene (meth)acrylic acid copolymer dispersions are hydrophilic and have poor chemical resistance and poor blush resistance. Crosslinkers (such as melamine formaldehyde, urea formaldehyde, phenol formaldehyde, alkali metal hydroxides, zinc/zirconium complexes and epoxy resins) have been used to improve chemical and blush resistance, but these crosslinkers do not produce a coating with sufficient chemical and blush resistance required for many packaging coating applications. The products of the present invention includes the use of certain crosslinkers to crosslink aqueous (poly)ethylene (meth)acrylic acid copolymers to provide a unique combination of properties such as water resistance, flexibility, chemical resistance and excellent adhesion on substrates.

The present invention provides an alternate to epoxy resins and surfactants free that still allows formaldehyde, phenolic and surfactant free cure, blush resistance, capability to retort and can withstand hard-to-hold beverages. The coating compositions of the invention can be made with a simple process, not requiring multiple polymers or processing stages to achieve the intended effect.

The present invention includes hybrid water dispersions. In some embodiments of the invention, a hybrid water dispersion is prepared by mixing a (poly)ethylene (meth)acrylic acid copolymer in water to form a mixture, and reacting the mixture with an organosilane compound to form the hybrid water dispersion. The reaction mixture can include a nanoclay and/or a neutralizer. The hybrid water dispersions of the invention may be a (poly)ethylene (meth)acrylic acid organosilane copolymer designed to combine the water repellency, non-polluting and thermal stability of an organosilane compound with the mechanical strength, flexibility and cohesiveness of a (poly)ethylene (meth)acrylic acid copolymer matrix.

The present invention also includes hybrid (poly)ethylene (meth)acrylic acid organsilane copolymer composite latex emulsions. In some embodiments, a hybrid (poly)ethylene (meth)acrylic acid organsilane copolymer composite latex emulsion is prepared by reacting a mixture of a hybrid water dispersion with an ethylenically unsaturated monomer component. The reaction mixture can include a nanoclay and/or a neutralizer.

Still further, the present invention includes (poly)ethylene (meth)acrylic acid copolymer composite latex emulsions. In some embodiments, a (poly)ethylene (meth)acrylic acid copolymer composite latex emulsion is prepared by a method comprising mixing a (poly)ethylene (meth)acrylic acid copolymer in water to form a mixture, and mixing the mixture with an ethylenically unsaturated monomer component to form the (poly)ethylene (meth)acrylic acid copolymer composite latex emulsion. The reaction mixture can include a nanoclay and/or a neutralizer.

The present invention also includes hybrid (poly)ethylene (meth)acrylic acid organsilane copolymer composite latex emulsions. In some embodiments, a hybrid (poly)ethylene (meth)acrylic acid organsilane copolymer composite latex emulsion is prepared by reacting a mixture of a (poly)ethylene (meth)acrylic acid copolymer composite latex emulsion with an organosilane compound. The reaction mixture can include a nanoclay and/or a neutralizer.

The hybrid water dispersions, (poly(ethylene) (meth) acrylic acid copolymer composite latex emulsions, hybrid (poly)ethylene (meth)acrylic acid organsilane composite latex emulsions can be used in the preparation of coating compositions suitable, inter alia, as packaging coatings for food and beverage packaging and containers, including beer and beverage external/interior easy-open-ends and plastic bottles. Easy-open-ends for beer and beverage cans are typically manufactured by first coating a flat sheet of a metal substrate, heating the coated substrate, and then stamping or shaping the coated substrate into the desired shape. The coatings for beer and beverage can ends may be applied in film weights of about 1 milligram per square inch to about 15 milligrams per square inch on a high speed coil coating line. High speed coil coating lines require a coating material that will dry and cure within a few second as it is heated very rapidly to a peak metal temperature that can range from about 200 to about 300° C.

The present invention also includes coating compositions formed from the foregoing, methods of coating substrates with the foregoing, and substrates coated with the foregoing.

DETAILED DESCRIPTION OF THE INVENTION

The present invention includes substrates coated at least in part with a coating composition of the invention and methods for coating the substrates. The term "substrate" as used herein includes, without limitation, plastic bottles, cans, metal (such as aluminum) cans, beer and beverage easy-open-ends, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

The present invention includes hybrid water dispersions. In some embodiments of the invention, a hybrid water dispersion is prepared by mixing a (poly)ethylene (meth)acrylic acid copolymer in water to form a mixture, and reacting the mixture with an organosilane compound to form the hybrid water dispersion. The reaction mixture can include a nanoclay and/or a neutralizer. The hybrid water dispersions of the invention may be a (poly)ethylene (meth)acrylic acid organosilane copolymer designed to combine the water repellency, non-polluting and thermal stability of an organosilane compound with the mechanical strength, flexibility and cohesiveness of a (poly)ethylene (meth)acrylic acid copolymer matrix.

Without limitation, the (poly)ethylene (meth)acrylic acid copolymer may comprise a Primacor® resin available from Dow Chemical such as Primacor® 5980i or Primacor® 5990i, a Nucrel® resin available from DuPont such as Nucrel® 2806, Nucrel® 925, Nucrel® 960, and the like, as well as combinations thereof. The (poly)ethylene (meth) acrylic acid copolymer may be present in an amount from about 30 to about 90 wt % of the hybrid water dispersion. Additional waterborne compounds can be present in combination with the (poly)ethylene (meth)acrylic acid copolymer.

In some embodiments, the (poly)ethylene (meth)acrylic acid copolymer including without limitation, a Primacor® resin available from Dow Chemical such as Primacor® 5980i, Primacor® 5990i, Nucrel® resin available from DuPont such as Nucrel® 2806, Nucrel® 925 and Nucrel® 960 water dispersion are readily prepared by contacting the resin with a base at the temperature of 95-120° C. with solid content of 20-35% solid. The dispersion process should be carried out at a minimum of 92° C. for open reactor. If a closed reactor is used, temperatures of 105-120° C. may be used to make >27% solid water dispersion.

The organosilane compound of the invention may include without limitation 3-trimethoxysilyl propyl methacrylate (MPS), 3-methacryloxypropyltrimethoxysilane, 3-glycidyloxypropyltriethoxysilane, 3-glycidyloxypropyltrimethoxysilane, Dynasylan Glymo®, Dynasylan Glyeo® available from Evonik, CoatOsil® MP 200 from Momentive, aminoethylaminopropyltrimethoxysilane, vinyltriethoxysilane (VTES), tetramethoxysilane, tetraethoxysilane, methyltrimethoxysilane, colloidal silica, inorganic silica particles, and the like, as well as combinations thereof. In some embodiments, the organosilane compound is present in an amount from about 0.1 to about 30% by weight of total polymer solids, or from about 1 to about 20 wt % or from about 5 to about 12 wt %.

In some embodiments of the invention, a nanoclay may include without limitation Closite® 30B, Closite® 11B, synthetic laponite, and the like, as well as mixtures thereof. The nanoclay may improve abrasion resistance and hardness of the coating composition. In some embodiments, a nanoclay can be mixed with an ethylenically unsaturated monomer component. The ethylenically unsaturated monomer component can swell nanoclay and penetrate into the interlayer spacing of the nanoclay to obtain an intercalated product. The interlayer of the nanoclay can be expanded in an ethylenically unsaturated monomer component aided by a high shear rotor mixer over about 30 to 40 minutes. High shear causes the nanoclay layer to expand to obtain an intercalated/exfoliated clay-monomer mixture. The viscosity of clay-monomer mixture increases dramatically. The nanoclay loading can be from about 1 to about 5 wt % based on the weight of the ethylenically unsaturated monomer component. Polymerization occurs via the monomers, with some being located in the interlayer of nanoclay to produce an exfoliated nanocomposite.

The reaction mixtures of the present invention may include a neutralizer such as without limitation ammonia, a tertiary amine, dimethylethanolamine, 2-dimethylamino-2-methyl-1-propanol, tributylamine, morpholine, diethanolamine, triethanolamine, monoethanolamine, sodium hydroxide, potassium hydroxide, lithium hydroxide, and the like, as well as combinations thereof. In some embodiments, the neutralizer is present in an amount from about 20 to 100% mole-to-mole of acid in the compound to be neutralizer.

The present invention includes hybrid (poly)ethylene (meth)acrylic acid organsilane copolymer composite latex emulsions. In some embodiments, the hybrid (poly)ethylene (meth)acrylic acid organsilane copolymer composite latex emulsions are prepared by reacting a mixture of a hybrid water dispersion with an ethylenically unsaturated monomer component. The reaction mixture can include a nanoclay and/or a neutralizer.

The (poly)ethylene (meth)acrylic acid organsilane copolymer composite latex emulsions used in the present invention can be prepared in some embodiments by techniques known in the art, such as without limitation, suspension polymerization, interfacial polymerization, and emulsion polymerization. Emulsion polymerization techniques for preparing latex emulsions from ethylenically unsaturated monomer components are well known in the polymer arts, and any conventional latex emulsion technique can be used, such as for non-limiting example, single and multiple shot batch processes, and continuous processes. In some embodiments, an ethylenically unsaturated monomer component (which may include and/or function as a crosslinker) is prepared and added in different stages to the polymerization vessel. The order of monomer addition (such as hydroxyl, organosilane and acid monomers) may be in the order from most hydrophobic to most hydrophilic, which can help to increase retort resistance, stabilize the latex particles and provide good wetting and adhesion on coated substrates. The ethylenically unsaturated monomer component (such as glycidyl methacrylate, glycerol dimethacrylate, 1,4-butanediol dimethacrylate, or a combination thereof) may include and/or function as a crosslinker in order to increase mechanic properties of the film and abrasion resistance. The ethylenically unsaturated monomer component may be varied during the course of the polymerization, such as, for non-limiting example, by altering the composition of the ethylenically unsaturated monomer component being fed into the vessel. Both single and multiple stage polymerization techniques can be used. In some embodiments, the hybrid latex emulsions are prepared using a seed monomer emulsion to control the number and the size of particles produced by emulsion polymerization. The particle size of the (poly)ethylene (meth)acrylic acid organsilane copolymer composite latex emulsions particles are controlled in some embodiments by adjusting the initial surfactant charge.

There are at least several different ways to crosslink the hybrid water dispersions and the (poly)ethylene (meth)acrylic acid organsilane copolymer composite latex emulsions in order to raise the molecular weight. In one embodiment, the hybrid water dispersions and the (poly)ethylene (meth)acrylic acid organsilane copolymer composite latex emulsions can be crosslinked by at least one ethylenically unsaturated monomer component such as tripropylene glycol di(meth)acrylate, diethylene glycol di(meth)acrylate, ethyl glycol di(meth)acrylate, 1,6-hexanediol di(meth)acrylate, glycerol di(meth)acrylate, or a combination thereof. In another embodiment, if the hybrid water dispersions and the (poly)ethylene (meth)acrylic acid organsilane copolymer composite latex emulsions have functional groups, such as methacrylate acid, the hybrid water dispersions and the (poly)ethylene (meth)acrylic acid organsilane copolymer composite latex emulsions can be crosslinked by glycidyl groups, such as without limitation glycidyl methacrylate. In a third embodiment, if the hybrid water dispersions and the (poly)ethylene (meth)acrylic acid organsilane copolymer composite latex emulsions have hydroxyl functional group monomers, such as without limitation hydroxypropyl methacrylate, the hybrid water dispersions and the (poly)ethylene (meth)acrylic acid organsilane copolymer composite latex emulsions can be crosslinked with a phenolic resin to achieve suitable physical properties of the hybrid water dispersions and the (poly)ethylene (meth)acrylic acid organsilane copolymer composite latex emulsions on a substrate.

Suitable crosslinkers can include, but are not limited to, urea-formaldehyde, phenol-formaldehyde, benzoguanamine formaldehyde, phenolic resins, and combinations thereof. In some embodiments of the invention, the ethylenically unsaturated monomer component may include and/or function as the crosslinker. In addition, the crosslinker may be added as a component separate from the ethylenically unsaturated monomer component. In some embodiments, the amount of the crosslinker is about 0.1 to about 30 wt % based on the total polymer solids content in the hybrid water dispersions or the (poly)ethylene (meth)acrylic acid organsilane copolymer composite latex emulsions. The crosslinker may help improve chemical resistance and/or water blush resistance. However, if the amount of the crosslinker is too high, the film may lose flexibility.

The hybrid water dispersions and the (poly)ethylene (meth)acrylic acid organsilane copolymer composite latex emulsions particle structures can be controlled by polymerization processes. The hybrid water dispersions and the (poly)ethylene (meth)acrylic acid organsilane copolymer composite latex emulsions particles may be prepared by a series of consecutive emulsion polymerization sequences with different monomer types, where the second (third, etc.) stage monomer is polymerized in the presence of seed latex particles. These seed particles may be prepared in a separate step or formed in situ during the emulsion polymerization.

The ethylenically unsaturated monomer component can be composed of a single monomer or a mixture of monomers in various embodiments of the invention. When the hybrid water dispersions or the (poly)ethylene (meth)acrylic acid organsilane copolymer composite latex emulsions are polymerized with at least one different ethylenically unsaturated monomer component to prepare the hybrid water dispersions and the (poly)ethylene (meth)acrylic acid organsilane copolymer composite latex emulsions, at least one different ethylenically unsaturated monomer component may be added to the mixture of monomers. In some embodiments, the ethylenically unsaturated monomer component may include and/or function as the crosslinker. In some embodiments, the ethylenically unsaturated monomer component and/or the different ethylenically unsaturated monomer component may present in an amount up to about 60% based on total solids content of the ethylenically unsaturated monomer component mixture. The ethylenically unsaturated monomer component and the different ethylenically unsaturated monomer component may include, without limitation, a saturated or unsaturated organosilane compound, an organosilane compound with one or more reactive organic groups and one or more hydrolysable inorganic groups, one or more vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, dicyclopentadiene, as well as combinations thereof. Vinyl alkyl ethers may include without limitation, methyl vinyl ether, isopropyl vinyl ether, n-butyl vinyl ether, isobutyl vinyl ether, and combinations thereof. Acrylic monomers may include without limitation, monomers such as for non-limiting example, lower alkyl esters of acrylic or methacrylic acid having an alkyl ester portion other than methyl or ethyl containing about 3 to about 10 carbon atoms, as well as aromatic derivatives of acrylic and methacrylic acid, and combinations thereof. Acrylic monomers may include, for non-limiting example, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, and amino acrylates and methacrylates, as well as combinations thereof.

In some embodiments, the ethylenically unsaturated monomer component and/or the different ethylenically unsaturated monomer component include at least one multi-ethylenically unsaturated monomer component effective to raise the molecular weight and to help crosslinking. Non-limiting examples of multi-ethylenically unsaturated monomer components include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, divinylnaphthalene, and combinations thereof. In some embodiments, the multi-ethylenically unsaturated monomer component is present in an amount from about 0.1 to about 5% of the total solids content of the ethylenically unsaturated monomer component mixture.

In some embodiments of the invention, the ethylenically unsaturated monomer component and/or the different ethylenically unsaturated monomer component is mixed in a carrier to form a monomer emulsion. Optionally, a base is present in the mixture. In some embodiments, the stabilizer is present in an amount from about 0.1% to 5.0% by weight polymeric solids. Non-limiting examples of a base include ammonia, dimethylethanolamine, 2-dimethylamino-2-methyl-1-propanol, and combinations thereof. In some embodiments, the base is present in an amount of about 50% to 100% mole to mole of stabilizer.

In some embodiments, the carrier includes, without limitation, water, a water soluble cosolvent, or a combination thereof. The carrier is present in an amount of about 30 to about 70 wt % of the hybrid latex emulsion in some embodiments.

In some embodiments of the invention, the monomer emulsion, the hybrid water dispersion, and/or the (poly)ethylene (meth)acrylic acid organsilane copolymer composite latex emulsion is reacted with one or more initiators. The initiator may include, for non-limiting example, an initiator which thermally decomposes at the polymerization temperature to generate free radicals. Examples of initiators include, without limitation, both water-soluble and water-insoluble species, as well as combinations thereof. Examples of free radical-generating initiators include, for non-limiting example, persulfates, such as without limitation, ammonium or alkali metal (potassium, sodium or lithium) persulfate, azo compounds such as without limitation, 2,2'-azo-bis(isobutyronitrile), 2,2'-azo-bis(2,4-dimethylvaleronitrile), and 1-t-butyl-azocyanocyclohexane), hydroperoxides such as without limitation, t-butyl hydroperoxide and cumene hydroperoxide, peroxides such as without limitation, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate, peresters such as without limitation, t-butyl peracetate, t-butyl perphthalate, and t-butyl perbenzoate, percarbonates, such as without limitation, di(1-cyano-1-methylethyl)peroxy dicarbonate, perphosphates, and the like, as well as combinations thereof.

In some embodiments, the initiator is used alone or as the oxidizing component of a redox system, which may include, without limitation, a reducing component such as, for non-limiting example, ascorbic acid, maleic acid, glycolic acid, oxalic acid, lactic acid, thioglycolic acid, or an alkali metal sulfite, such as without limitation, a hydrosulfite, hyposulfite or metabisulfite, such as without limitation, sodium hydrosulfite, potassium hyposulfite and potassium metabisulfite, or sodium formaldehyde sulfoxylate, as well as combinations thereof. The reducing component can be referred to as an accelerator or a catalyst activator.

The initiator and accelerator, which can be referred to as an initiator system, may be used in some embodiments in proportions from about 0.001% to about 5% based on the weight of ethylenically unsaturated monomer component to be copolymerized. Promoters such as without limitation, chloride and sulfate salts of cobalt, iron, nickel or copper are optionally employed in amounts from about 2 to about 200 ppm in some embodiments. Non-limiting example of redox catalyst systems include, without limitation, tert-butyl hydroperoxide/sodium formaldehyde sulfoxylate/Fe(II), ammonium persulfate/sodium bisulfite/sodium hydro sulfite/Fe(II), and combinations thereof. In some embodiments, the polymerization temperature is from about room temperature to about 90° C., and the temperature can be optimized for the initiator system employed, as is conventional.

In some embodiments of the invention, aggregation of polymeric particles may be limited by including a stabilizing surfactant during polymerization. For non-limiting example, the growing particles may be stabilized during emulsion polymerization by one or more surfactants such as, without limitation, dodecylbenzene sulfonic acid, an anionic or nonionic surfactant, or a combination thereof. Other types of stabilizing agents can be used in some embodiments, such as without limitation, protective colloids. Generally speaking, conventional anionic surfactants with metal, nonionic surfactants containing polyethylene chains and other protective colloids tend to impart water sensitivity to the resulting films. In some embodiments of the invention, it is desirable to minimize or avoid the use of these conventional anionic and nonionic surfactants. In some embodiments, the stabilizing surfactant is employed during seed polymerization.

Chain transfer agents are used in some embodiments of the invention to help control the molecular weight of the hybrid latex emulsion. Non-limiting examples of chain transfer agents include mercaptans, polymercaptans, polyhalogen compounds, alkyl mercaptans such as without limitation, ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan, mercapto carboxylic acids and their esters, such as without limitation, methyl mercaptopropionate and 3-mercaptopropionic acid, alcohols such as without limitation, isopropanol, isobutanol, lauryl alcohol and t-octyl alcohol, halogenated compounds such as without limitation, carbon tetrachloride, tetrachloroethylene, tricholorobromoethane, and combinations thereof. In some embodiments, up to about 10% by weight of a chain transfer agent is used, based on the weight of the ethylenically unsaturated monomer component mixture. The hybrid latex emulsion molecular weight may be controlled in some embodiments by controlling the ratio of initiator to the ethylenically unsaturated monomer component.

In some embodiments, the initiator system and/or chain transfer agent is dissolved or dispersed in separate fluid mediums or in the same fluid medium, and then gradually added to the polymerization vessel. In some embodiments, the ethylenically unsaturated monomer component (either neat or dissolved or dispersed in a fluid medium) is added simultaneously with the catalyst and/or the chain transfer agent. The catalyst may be added to the polymerization mixture to "chase" residual monomer after polymerization has been substantially completed to polymerize the residual monomer.

In some embodiments, an additional monomer mixture of an ethylenically unsaturated monomer component and a stabilizer is added to the monomer emulsion. Optionally, a base is present in the additional monomer mixture. The additional monomer mixture can be added to the monomer emulsion in some embodiments prior to addition of the initiator, after addition of the initiator, or both before and after addition of the initiator. The compositions of the ethylenically unsaturated monomer component and base in the additional monomer mixture can be the same as or different than the compositions of these components in the monomer emulsion.

The hybrid water dispersions and the (poly)ethylene (meth)acrylic acid organsilane copolymer composite latex emulsions may be reacted with a neutralizer in some embodiments of the invention to form a coating composition. In some embodiments, the reaction occurs in the presence of a solvent with or without a phenolic crosslinker, such as without limitation Sakuranomiya Chemical Company's MC-16, Cytec's EP-560, PH2028, PH2013/65B, PR899/60MPC, Hexion's PF6535LB, SI Group's SFC112/65, Ruters's 7700 LB, or a combination thereof. Solvents may include without limitation xylene, benzene, ethyl benzene, toluene, alkoxy alkanols, methanol, ethanol, propanol, butanol, alkyl ethers of ethylene, alkyl ethers of propylene glycol, ethylene glycol monobutyl ether, ethylene glycol ethyl ether, diethylene glycol monobutyl ether, a ketone, an aromatic solvent, an ester solvent, a hydroxyl functional solvent, and combinations thereof. The amount of the solvent in the coating composition may be up to about 90% by weight of the polymeric solids, or from about 20% to about 45% by weight of the liquid coating composition. If water is present, the amount of water in the coating composition may range from about 20% to about 50%.

The glass transition temperature (Tg) of the composition may depend on the total monomer composition and may contribute to blush resistance, lube bloom and abrasion resistance. For non-limiting example, if the polymer has increased amounts of methacrylic acid, then the polymer may have a higher Tg. In some embodiments of the invention, the Tg is from about 5 to about 50° C. If the Tg is too low, the film may be too soft and may have insufficient abrasion resistance. If the Tg is too high, the film may wrinkle and may not have enough flexibility which may decrease film performance. The cure temperature may be about 200 to about 300° C.

The hybrid water dispersions and the (poly)ethylene (meth)acrylic acid organsilane copolymer composite latex emulsions and the coating compositions of the invention can include conventional additives known to those skilled in the art, such as without limitation, additives to control foam, reduce equilibrium and dynamic surface tension, or to control rheology and surface lubricity. Amounts can vary depending on desired coating application and performance in any manner known to those skilled in the art.

One or more coating compositions of the invention may be applied to a substrate in some embodiments, such as for non-limiting example, cans, metal cans, beer and beverage easy-open-ends, packaging, containers, receptacles, can ends, or any portions thereof used to hold or touch any type of food or beverage. In some embodiments, one or more coating compositions are applied in addition to the coating composition of the present invention, such as for non-limiting example, a prime coat may be applied between the substrate and a coating composition of the present invention.

The coating compositions can be applied to substrates in any manner known to those skilled in the art. In some embodiments, the coating compositions are sprayed onto a substrate. When spraying, the coating composition may contain, for non-limiting example, from about 10 to about 30% by weight of the polymeric solids relative to about 70 to about 90% water including other volatiles such as, without limitation, minimal amounts of solvents, if desired. For some applications, typically those other than spraying, the aqueous polymeric dispersions may contain, for non-limiting example, from about 20 to about 60% by weight of the polymer solids. Organic solvents may be utilized in some embodiments to facilitate spray or other application methods and such solvents may include, without limitation, n-butanol, 2-butoxy-ethanol-1, xylene, toluene, and mixtures thereof. In some embodiments, n-butanol is used in combination with 2-butoxy-ethanol-1. The coating compositions of the present invention may be pigmented and/or opacified with known pigments and opacifiers in some embodiments. For many uses, including food use for non-limiting example, the pigment may be titanium dioxide.

The resulting aqueous coating compositions may be applied in some embodiments by conventional methods known in the coating industry. Thus, for non-limiting example, spraying, rolling, dipping, and flow coating application methods can be used for both clear and pigmented films. In some embodiments, after application onto a substrate, the coating may be cured thermally at temperatures in the range from about 215 to about 250° C., and alternatively higher for a time sufficient to effect complete curing as well as volatilizing any fugitive components therein.

For substrates intended as beverage containers, the coating compositions may be applied in some embodiments at a rate in the range from about 0.5 to about 15 milligrams per square inch of polymer coating per square inch of exposed substrate surface. In some embodiments, the water-dispersible coating composition may be applied at a thickness from about 1 to about 25 microns.

Compared to conventional epoxy-acrylic commercial materials, the present invention offers simplicity of manufacture in some embodiments because one single polymer may be used in the emulsion polymerization process. It was surprising that desired properties could be achieved by sol-gel crosslinking reactions. One unique aspect of the invention is that an organosilane compound (such as MPS or 3-glycidyloxypropyltrimethoxysilane) can be used in the hybrid water dispersions and the (poly)ethylene (meth)acrylic acid organsilane copolymer composite latex emulsions to contribute to hybrid water dispersions, (poly)ethylene (meth)acrylic acid organsilane copolymer composite latex emulsions and coating compositions having acceptable blush resistance, abrasion resistance, blister resistance, hardness and scratch resistance. Additional phenolic resins or crosslinkers can be blended into the hybrid latex emulsions to enhance film properties. Coating compositions of the present invention can be applied on panels and during fabrication of beverage easy-open-ends for packaging coating applications.

For substrates intended as beverage easy-open-ends, the coating are applied in some embodiments at a rate in the range from about 1.5 to about 15 milligrams of polymer coating per square inch of exposed substrate surface. Conventional packaging coating compositions are applied to metal at about 232 to about 247° C. Some of the coating compositions of the current invention achieve good results at about 230° C. or below, such as at about 210° C. or below. This decreased temperature provides an energy savings to the coater, and it may allow the use of different alloys, such as tin-plated steel used for easy-open-ends. This also allows to recycle the ends together with the can body.

In some embodiments of the invention, the hybrid water dispersions and the (poly)ethylene (meth)acrylic acid organsilane copolymer composite latex emulsions can be prepared by mini-emulsion polymerization. The mini-emulsion polymerization may be done with a high shear Ross mixer for about 10 minutes at medium speed and then about another 10 minutes at high speed (>10,000 rpm) to achieve stable particles. This mixture, along with an initiator solution can be pumped into a reactor to form a hybrid water dispersions and a (poly)ethylene (meth)acrylic acid organsilane copolymer composite latex emulsions.

Still further, the present invention includes (poly)ethylene (meth)acrylic acid copolymer composite latex emulsions. In some embodiments, a (poly)ethylene (meth)acrylic acid copolymer composite latex emulsion is prepared by a method comprising mixing a (poly)ethylene (meth)acrylic acid copolymer in water to form a mixture, and mixing the mixture with an ethylenically unsaturated monomer component to form the (poly)ethylene (meth)acrylic acid copolymer composite latex emulsion. The reaction mixture can include a nanoclay and/or a neutralizer.

The present invention also includes hybrid (poly)ethylene (meth)acrylic acid organsilane copolymer composite latex emulsions. In some embodiments, a hybrid (poly)ethylene (meth)acrylic acid organsilane copolymer composite latex emulsion is prepared by reacting a mixture of a (poly)ethylene (meth)acrylic acid copolymer composite latex emulsion with an organosilane compound. The reaction mixture can include a nanoclay and/or a neutralizer.

The organosilane compound itself or in combination with a crosslinker can crosslink a hybrid water dispersion, a hybrid (poly)ethylene (meth)acrylic acid organsilane copolymer composite latex emulsion, or a (poly)ethylene (meth)acrylic acid copolymer composite latex emulsion to improve retort blush resistance.

It is contemplated that the dual nature of the organosilane compound allows the organosilane compound to react with both inorganic and organic polymers as shown in Scheme 1.

mation of silica network can improve the polymer thermal stability, mechanical strength and coating film blush resistance. The crosslinked network may improve blush and retort resistance.

The products of the present invention may comprise a relatively homogenous water dispersion particle structure and/or an inhomogeneous water dispersion particle structure. The hybrid water dispersion particle structure may be controlled by the polymerization processes, including for non-limiting example a multi-stage polymerization process. Such particle structures are usually prepared by a series of consecutive emulsion polymerization sequences with different monomer types, where the second stage monomer is polymerized in the presence of seed water dispersion particles.

The products of the invention can include conventional additives known to those skilled in the art, such as without limitation, additives to control foam, reduce equilibrium and

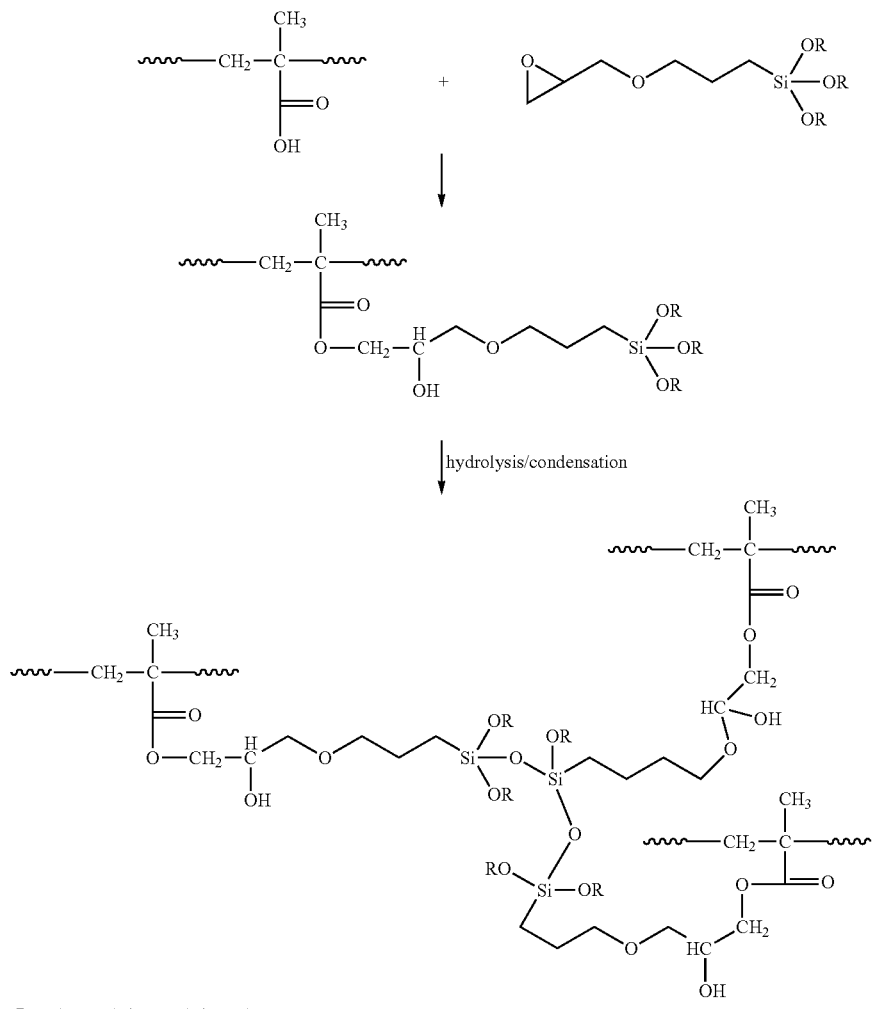

Scheme 1 - An acidic organic polymer reacts with 3-glycidyloxypropyltrialkoxysilane.

(R can be a methyl or an ethyl group)

In some embodiments, a functional group such as an acid in the organic polymer chain can react with an organic functional group, such as an epoxy, in the organosilane compound. Silanol groups in inorganic phase can undergo a condensation reaction at high pH. Condensation rates can increase with increasing pH and/or temperature to result in a highly crosslinked network as shown in Scheme 1. The for-dynamic surface tension, or to control rheology and surface lubricity. Amounts can vary depending on desired coating application and performance in any manner known to those skilled in the art.

One or more coating compositions of the invention may be applied to a substrate in some embodiments, such as for non-limiting example, cans, metal cans, beer and beverage easy-open-ends, packaging, containers, receptacles, can ends, or any portions thereof used to hold or touch any type of food or beverage. In some embodiments, one or more coating compositions are applied in addition to the coating composition of the present invention, such as for non-limiting example, a prime coat may be applied between the substrate and a coating composition of the present invention.

The coating compositions can be applied to substrates in any manner known to those skilled in the art. In some embodiments, the coating compositions are sprayed onto a substrate. When spraying, the coating composition may contain, for non-limiting example, from about 10% to about 30% by weight of the polymeric solids relative to about 70% to about 90% water including other volatiles such as, without limitation, minimal amounts of solvents, if desired. For some applications, typically those other than spraying, the aqueous polymeric dispersions may contain, for non-limiting example, from about 20% to about 60% by weight of the polymer solids. Organic solvents may be utilized in some embodiments to facilitate spray or other application methods and such solvents may include, without limitation, n-butanol, 2-butoxy-ethanol-1, xylene, toluene, and mixtures thereof. In some embodiments, n-butanol is used in combination with 2-butoxy-ethanol-1. The coating compositions of the present invention may be pigmented and/or opacified with known pigments and opacifiers in some embodiments. For many uses, including food use for non-limiting example, the pigment may be titanium dioxide. The resulting aqueous coating compositions may be applied in some embodiments by conventional methods known in the coating industry. Thus, for non-limiting example, spraying, rolling, dipping, and flow coating application methods can be used for both clear and pigmented films. In some embodiments, after application onto a substrate, the coating may be cured thermally at temperatures in the range from about 215° C. to about 250° C., and alternatively higher for a time sufficient to effect complete curing as well as volatilizing any fugitive components therein.

For substrates intended as beverage containers, the coating compositions may be applied in some embodiments at a rate in the range from about 0.5 to about 15 milligrams per square inch of polymer coating per square inch of exposed substrate surface. In some embodiments, the water-dispersible coating composition may be applied at a thickness from about 1 to about 25 microns.

Compared to conventional epoxy-acrylic commercial materials, the present invention offers simplicity of manufacture such that one single polymer may be used in an emulsion polymerization process. One unique aspect of the invention is that the crosslinkers can be used in the coating compositions to contribute to coating films having acceptable blush resistance and water retort resistance.

For substrates intended as beverage easy-open-ends, the coating are applied in some embodiments at a rate in the range from about 1.5 to about 15 milligrams of polymer coating per square inch of exposed substrate surface. Conventional packaging coating compositions are applied to metal at about 232 to about 247° C. Some of the coating compositions of the current invention achieve good results at about 230° C. or below, such as at about 210° C. or below. This decreased temperature provides an energy savings to the coater, and it may allow the use of different alloys, such as tin-plated steel used for easy-open-ends. This also allows to recycle the ends together with the can body.

EXAMPLES

The invention will be further described by reference to the following non-limiting examples. It should be understood that variations and modifications of these examples can be made by those skilled in the art without departing from the spirit and scope of the invention.

A hybrid water dispersion was prepared by the following process.

Example 1

Preparation of (Poly)Ethylene (Meth)Acrylic Acid Copolymer Mixture

| Ingredient | Weight |
|---|---|
| A) Deionized water | 58.53 g |
| B) Primacor ® 5980i | 24.39 g |
| C) Dimethyl ethanolamine | 2.93 g |
| D) Deionized water | 14.15 g |

Group A and B were charged into a flask and heated to 40° C. under a nitrogen sparge. Agitation was turned on. Group C was added to the mixture under agitation. The mixture was heated to 98° C. until the Primacor was completely dissolved. Group D was added and the mixture was cooled to 40° C. The total solids content of the mixture was 24.39%.

Example 2

Preparation of (Poly)Ethylene (Meth)Acrylic Acid Copolymer Mixture

| Ingredient | Weight |
|---|---|
| A) Deionized water | 58.53 g |
| B) Nucrel ® 925 | 24.39 g |
| C) Dimethyl ethanolamine | 3.5 g |
| D) Deionized water | 35.53 g |

Group A and B were charged into a flask and heated to 40° C. under a nitrogen sparge. Agitation was turned on. Group C was added to the mixture under agitation. The mixture was heated to 98° C. until the Nucrel was completely dissolved. Group D was added and the mixture was cooled to 40° C. The total solids content of the mixture was 20%.

Example 3

Preparation of (Poly)Ethylene (Meth)Acrylic Acid Copolymer Mixture

| Ingredient | Weight |
|---|---|
| A) Deionized water | 1950 g |
| B) Primacor ® 5980i | 850 g |
| C) 50% (weight %) NaOH | 114 g |
| D) Deionized water | 703 g |

Group A and B were charged into a flask and heated to 40° C. under a nitrogen sparge. Agitation was turned on. Group C was added to the mixture under agitation. The mixture was heated to 98° C. until the Primacor was completely dissolved.

Group D was added and the mixture was cooled to 40° C. The total solids content of the mixture is 23.5%.

Example 4

Preparation of (Poly)Ethylene (Meth)Acrylic Acid Copolymer Mixture in a Pressure Reactor

| Ingredient | Weight |
| --- | --- |
| A) Deionized water | 540 g |
| B) Primacor ® 5980i | 250 g |
| C) Dimethyl ethanolamine | 20.8 g |

1. Group A, B and C were charged into a pressure reactor
2. Turned the nitrogen outlet valve.
3. Turned on agitation.
4. Heated reactor to 90° C.
5. Held 90° C. for 30 minutes.
6. Closed the gas outlet valve. The pressure would be built up by hot water pressure.
7. Set up reactor temperature at 120° C.
8. Held the reactor for 3 hours at 120° C.
9. Cooled reactor after 3 hours holding.
10. When reactor temperature reached 95° C., opened the outlet valve of the reactor to release the pressure.
11. When reactor temperature reached 40° C., turned off agitation. The total solids content of the mixture is 30.8%

Example 5

(Poly)Ethylene (Meth)Acrylic Acid Copolymer Latex Emulsion from Example 1 with 37% (Based on Total Polymer Solid) of Primacor 5980i and 63% Acrylate

| Ingredient | Weight |
| --- | --- |
| A) Example 1 | 169.5 g |
| A) Deionized water | 150.0 g |
| B) Methyl methacrylate (MMA) | 122.21 g |
| B) Divinylbenzene | 2.72 g |
| B) Butyl acrylate | 17.07 g |
| B) Example 1 | 169.5 g |
| B) Deionized water | 155 g |
| C) Deionized water | 100 g |
| D) Ammonia persulfate | 1.5 g |
| D) Deionized water | 35 g |
| E) Deionized water | 50.0 g |
| F) Ascorbic acid | 0.15 g |
| F) Deionized water | 3.0 g |
| F) Iron (II) sulfate | 0.00001 g |
| G) t-butyl perbenzoate | 0.25 g |
| G) Deionized water | 2.0 g |

1. Group A was charged into a flask and heated to 80° C. under a nitrogen sparge. Agitation was turned on. The nitrogen sparge was changed to a blanket when the temperature reached 80° C.
2. Mix group B at container.
3. Stir group B at lower shear speed for 10 minutes to promote bulk flow using high shear rotor Ross mixer.
4. Keep mixing at high shear speed for 10 minutes under cooling with ice-water bath
5. Group C was used to wash Ross mixer.
6. Added 50 g of group B+C into reactor
7. Added 10 g of group D into flask
8. Held batch for 15 minutes at 80° C.
9. The rest of group B+C was pumped into the flask over 180 minutes.
10. The rest of group D was pump into reactor over 180 minutes
11. Group E was used to wash the pump while it was pumped into the flask.
12. The batch was held for 15 minutes at 80° C.
13. F was added and held for 5 minutes.
14. The reactor was then cooled to 70° C.
15. G was added over 20 minutes and held for 15 minutes at 70° C.
16. The batch was cooled to 38° C. and filtered The mini-emulsion is a relatively stable oil-in-water dispersion, which is typically obtained by shearing a system containing monomer(s), water, and stabilizer. The monomer droplets can range in diameter from 50-500 nm. Because of their small size, the large overall surface areas of the droplets cab effectively compete for radical capture. As a result, monomer droplets in a mini-emulsion become the dominant site for particle nucleation. The total solid is 23%. There was no grid left on 45 micrometer standard test sieve. The particle size is 23 nm (volume weigh mean) and particle size distribution is monomodal.

Example 6

(Poly)Ethylene (Meth)Acrylic Acid Copolymer Nanocomposite Latex Emulsion from Example 3 with 50% (Based on Total Polymer Solid) of Primacor 5980i, 46.1% Acrylate and 3.9% Nanoclay Cloisite 30B

| Ingredient | Weight |
| --- | --- |
| A) Example 3 | 60 g |
| A) Deionized water | 50 g |
| B) Divinylbenzene | 2.0 g |
| B) Methyl methacrylate (MMA) | 100 g |
| B) Butyl acrylate | 15 g |
| B) Closite 30 B | 9.8 g |
| C) Example 3 | 480 g |
| C) Deionized water | 130 g |
| D) Deionized water | 100 g |
| E) Ammonia persulfate | 1.7 g |
| E) Deionized water | 50 g |
| F) Deionized water | 20 g |
| G) Ascorbic acid | 0.15 g |
| G) Deionized water | 3.0 g |
| G) Iron (II) sulfate | 0.00001 g |
| H) t-butyl perbenzoate | 0.25 g |
| H) Deionized water | 2.0 g |

1. Mixed group B for 24 hours under stir.
2. Group A was charged into a flask and heated to 80° C. under a nitrogen sparge. Agitation was turned on. The nitrogen sparge was changed to a blanket when the temperature reached 80° C.
3. Stirred group B+C at lower shear speed for 10 minutes to promote bulk flow using high shear rotor Ross mixer.
4. Keep mixing at medium shear speed for 10 minutes under cooling with ice water bath.
5. Keep mixing at high shear speed for 10 minutes under cooling with ice-water bath
6. Group D was used to wash Ross mixer.
7. Added 60 g of group B+C+D into reactor
8. Added 15 g of group E into flask
9. Held batch for 15 minutes at 80° C.
10. Set reaction temperature 85° C. after exothermal reaction.
11. The rest of group B+C+D was pumped into the flask over 180 minutes at 85° C.

12. The rest of group E was pump into reactor over 180 minutes
13. Group F was used to wash the pump while it was pumped into the flask.
14. The batch was held for 15 minutes at 88° C.
15. F was added and held for 5 minutes.
16. The reactor was then cooled to 70° C.
17. G was added over 20 minutes and held for 15 minutes at 70° C.
18. The batch was cooled to 38° C. and filtered.

The total solid is 24.86%. There was no grid left on 45 micrometer standard test sieve. This means that nanoclay is incorporated into polymer matrix. The particle size is 25 nm (volume weigh mean). The glass transition temperature is very broad (47° C. to 85° C.). The composite latex emulsion was coated on PET perform and blow 0.5 liter bottle. There was no crack. The coating film has excellent flexibility. The bottle was clear. This means that nanoclay was exfoliated and distributed throughout the organic matrix.

Example 7

Preparation of Hybrid Water Dispersion with 10 wt % of an Organosilane Compound

| Acrylate water dispersion | Weight % |
|---|---|
| A) Mixture of Example 1 | 38.73 |
| B) Dynasylan ® Glymo (3-glycidyloxypropyltrimethoxysilane) | 1.93 |
| B) Propylene glycol | 8.17 |
| C) Deionized water | 8.17 |

At room temperature, Group B was added to Group A with stirring. Group C was added to the mixture of Group A and B. The hybrid water dispersion had a solids content of 21.87%. The Dynasylan® Glymo was 10 wt % of the weight of Primacor® (solids).

Example 8

Preparation of Hybrid Water Dispersion with 5 wt % of an Organosilane Compound

Example 7 was repeated, except the weight % of the Dynasylan® Glymo was reduced by 10% to 5 wt %.

Example 9

Preparation of Hybrid Water Dispersion with 5 wt % of a Sorbitol Glycidyl Ether

Example 8 was repeated, except the Dynasylan® Glymo was replaced by Erisys™ GE-60. Erisys™ GE-60 is a sorbitol glycidyl ether available from Emerand Performance Materials.

Example 10

Preparation of Hybrid Water Dispersion with 5 wt % of 1.4 Cyclohexanedimethanol Diglycidyl Ether Example 8 was repeated, except the Dynasylan® Glymo was replaced by 1,4-cyclohexanedimethanol diglycidyl ether.

Example 11

Analysis of Coating Compositions

The hybrid water dispersions of Examples 7-10 were applied onto 211 TFS substrates and baked for 9 seconds at a peak metal temperature of 232° C. The coating thicknesses were about 3-4 μm.

The coated panels were tested as follows.

Blush resistance measures the ability of a coating to resist attack by various solutions. Typically, blush is measured by the amount of water absorbed into a coated film. When the film absorbs water, it generally becomes cloudy or looks white. The coating compositions were evaluated with deionized water retort (90 minutes immersed into water at 250° F.). Retort blush was measured visually on a scale of 0-5. A blush of 0 means that there is no blush. A blush of 5 means that the film is completely white.

Solvent resistance is measured as a resistance to solvents, such as methyl ethyl ketone (MEK) or acetone. This test was performed as described in ASTM D 5402-93. The numbers of double-rubs (i.e. one back- and forth motion) is reported. MEK was used in the current tests.

Beaded Ericksen cup fabrication measures the ability of a coated substrate to retain its integrity as it simulates the formation process to produce a beverage can end. It is a measure of the presence of cracks or fractures in the beads. 1×1 inch drown cups were made by Ericksen Cupper.

Adhesion testing was performed on the beaded Ericksen cups to assess whether the coating adheres to the cups. The adhesion test was performed according to ASTM D 3359-Test Method B, using SCOTCH 610 tape, available from 3M Company of Saint Paul, Minn. Adhesion is generally rated on a scale of 0-5 where a rating of "0" indicates no adhesion failure and a rating of "5" indicates that film was completely off the substrate.

Blisters were measured by MEIJI Techno Microscopes and referenced by ASTM D714. The blisters were rated by none, a few or dense in this application.

| | Organosilane compound/or epoxy compound | Wt % of organosilane compound based on Primacor | Blush resistance | MEK rubs | Beaded Ericksen cup | Blisters |
|---|---|---|---|---|---|---|
| Example 8 | Dynasylan Glymo | 5 | 1 | 50 | 0 | No |
| Example 7 | Dynasylan Glymo | 10 | 0 | >100 | 0 | No |
| Example 9 | Erisys GE-60 | 5 | 4 | n/a | 3 | Yes |
| Example 10 | 1,4-cyclohexanedimethanol diglycidyl ether | 5 | 4 | n/a | 3 | Yes |

As shown by the table above, organosilane compounds of the present invention produced coating compositions with improved properties.

What is claimed is:

1. An ethylene (meth)acrylic acid copolymer composite latex emulsion prepared by a method comprising:
   a) mixing an ethylene (meth)acrylic acid copolymer and a neutralizer in water to form a mixture; and
   b) mixing the mixture with an ethylenically unsaturated monomer component to form an ethylene (meth)acrylic acid copolymer composite latex emulsion.

2. The ethylene (meth)acrylic acid copolymer composite latex emulsion of claim 1, wherein the reaction mixture further comprises an organosilane compound.

3. The ethylene (meth)acrylic acid copolymer composite latex emulsion of claim 2, wherein the organosilane compound comprises a reactive organic group and a hydrolysable inorganic methoxysilyl group.

4. The ethylene (meth)acrylic acid copolymer composite latex emulsion of claim 2, wherein the organosilane compound comprises 3-methacryloxypropyltrimethoxysilane, 3-glycidyloxypropyltriethoxysilane, 3-glycidyloxypropyltrimethoxysilane, or a combination thereof.

5. The ethylene (meth)acrylic acid copolymer composite latex emulsion of claim 1, wherein the reaction mixture comprises a nanoclay.

6. The ethylene (meth)acrylic acid copolymer composite latex emulsion of claim 1, wherein the reaction mixture further comprises a crosslinker.

7. The ethylene (meth)acrylic acid copolymer composite latex emulsion of claim 6, wherein the crosslinker comprises a phenolic resin, urea-formaldehyde, phenol-formaldehyde, benzoguanamine formaldehyde, alkali metal hydroxides, Zinc/zirconium complexes and epoxy or a combination thereof.

8. The ethylene (meth)acrylic acid copolymer composite latex emulsion of claim 1, wherein the reaction mixture further comprises a neutralizer.

9. The ethylene (meth)acrylic acid copolymer composite latex emulsion of claim 1, wherein the reaction mixture further comprises a nanoclay.

10. The ethylene (meth)acrylic acid copolymer composite latex emulsion of claim 1, wherein the ethylenically unsaturated monomer component comprises tripropylene glycol di(meth)acrylate, diethylene glycol di(meth)acrylate, ethyl glycol di(meth)acrylate, 1,6-hexanediol di(meth)acrylate, glycerol di(meth)acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, divinylnaphthalene, or a combination thereof.

11. A hybrid ethylene (meth)acrylic acid organosilane copolymer composite latex emulsion prepared by reacting the ethylene (meth)acrylic acid copolymer composite latex emulsion of claim 1 with an organosilane compound.

12. A coating composition comprising the ethylene (meth)acrylic acid copolymer composite latex emulsion of claim 1.

13. A coating composition comprising the hybrid ethylene (meth)acrylic acid organosilane copolymer composite latex emulsion of claim 11.

14. A substrate coated with the coating composition of claim 1.

15. A substrate coated with the coating composition of claim 11.

* * * * *